US005490031A

United States Patent [19]

Braun et al.

[11] Patent Number: 5,490,031

[45] Date of Patent: Feb. 6, 1996

[54] SOLENOID CONTROL CIRCUITRY

[75] Inventors: Scott W. Braun; Fred W. Haselow, both of Watertown; Slobodan Krstic, Brookfield, all of Wis.

[73] Assignee: Eaton Corporation, Cleveland, Ohio

[21] Appl. No.: 359,952

[22] Filed: Dec. 20, 1994

Related U.S. Application Data

[63] Continuation of Ser. No. 63,287, May 18, 1993, abandoned.

[51] Int. Cl.$^{6}$ .......... H02H 3/00

[52] U.S. Cl. .......... 361/93.000; 361/160; 361/154; 307/131

[58] Field of Search .......... 361/18, 93, 154, 361/167, 160; 307/25, 29, 131

[56] References Cited

U.S. PATENT DOCUMENTS 5,204,802 4/1993 Howes, Jr. et al. .......... 361/154

*Primary Examiner*—A. D. Pellinen
*Assistant Examiner*—Sally C. Medley
*Attorney, Agent, or Firm*—Tarolli, Sundheim & Covell

[57] ABSTRACT

Solenoid control circuitry can be used with either a first solenoid requiring a relatively large holding current or a second solenoid requiring a relatively small holding current. A solenoid connected with the solenoid control circuitry is initially energized to effect operation of the solenoid from an unactuated condition to an actuated condition. A detector detects whether a characteristic of the initial energization of the solenoid corresponds to a characteristic of the first solenoid or the second solenoid. The solenoid control circuitry varies the amount of holding current supplied to the solenoid as a function of whether the detector detects the first solenoid requiring the relatively large holding current or the second solenoid requiring a relatively small holding current. A fault detection circuit is provided to interrupt energization of the solenoid in the event of an excessive flow of current.

22 Claims, 3 Drawing Sheets

SOLENOID CONTROL CIRCUITRY

This is a continuation of application Ser. No. 08/063,287 filed on May 18, 1993 now abandoned.

BACKGROUND OF THE INVENTION

The present invention relates to a solenoid control circuit and, more specifically, to a solenoid control circuit which may be used with either a first solenoid requiring a relatively large holding current or a second solenoid requiring a relatively small holding current.

A known apparatus utilizes divert gates to direct sheet material articles toward receiving locations. The divert gates are moved between actuated and unactuated positions by solenoids. The solenoids used with the divert gates may be obtained from different manufacturers and have different electrical characteristics. Even though the solenoids used with the divert gates may have different electrical characteristics, it would be advantageous to be able to use the same solenoid control circuitry to control the operation of the solenoids.

SUMMARY OF THE INVENTION

Improved solenoid control circuitry can be used with either a first solenoid requiring a relatively large holding current or a second solenoid requiring a relatively small holding current. The solenoid control circuitry includes an output which can be connected with either one of the solenoids. The solenoid control circuitry is operable to provide a relatively large holding current to when the first solenoid requiring the relatively large holding current is connected with the output. The solenoid control circuitry is operable to provide a relatively small holding current when the second solenoid requiring the relatively small holding current is connected with the output.

The solenoid control circuitry is operable to initially energize a solenoid connected with the output to effect operation of the solenoid from an unactuated condition to an actuated condition. During initial energization of the solenoid connected with the solenoid control circuitry output, a detector detects whether a characteristic of the initial energization of the solenoid corresponds to a characteristic of initial energization of the first solenoid or a characteristic of initial energization of the second solenoid. The solenoid control circuitry provides a first holding current to the solenoid connected with the output in response to detecting an initial energization characteristic corresponding to the first solenoid. The solenoid control circuitry provides a second holding current, which is less than the first holding current, to the solenoid connected with the output in response to detecting an initial energization characteristic corresponding to the second solenoid.

BRIEF DESCRIPTION OF THE DRAWINGS

The foregoing and further features of the invention will become more apparent upon a consideration of the following description taken in connection with the accompanying drawings wherein.

DESCRIPTION OF ONE SPECIFIC PREFERRED EMBODIMENT

General Description

Solenoid control circuitry 10 (FIG. 1) is used to effect operation of a solenoid 12. The solenoid 12 may be either a first solenoid requiring a relatively large holding current or a second solenoid 12*a* requiring a relatively small holding current. Thus, the solenoid control circuitry 10 can be used with either one of two solenoids 12 or 12*a* even though the solenoids have different electrical characteristics.

The solenoid 12 12 may be connected with any suitable apparatus for performing any desired function. For example, the solenoid 12 or 12*a* may be used in association with a divert gate (not shown) which is movable from an unactuated condition to an actuated condition to divert sheet material article to a desired receiving location. To effect rapid operation of the divert gate from the unactuated condition to the actuated condition, the solenoid 12 or 12*a* is initially energized with a relatively large current. In order to enhance the operating life of the solenoid 12 or 12*a*, the relatively large current used to effect initial energization of the solenoid is reduced to a smaller holding current after the solenoid has been operated.

Figure 2:
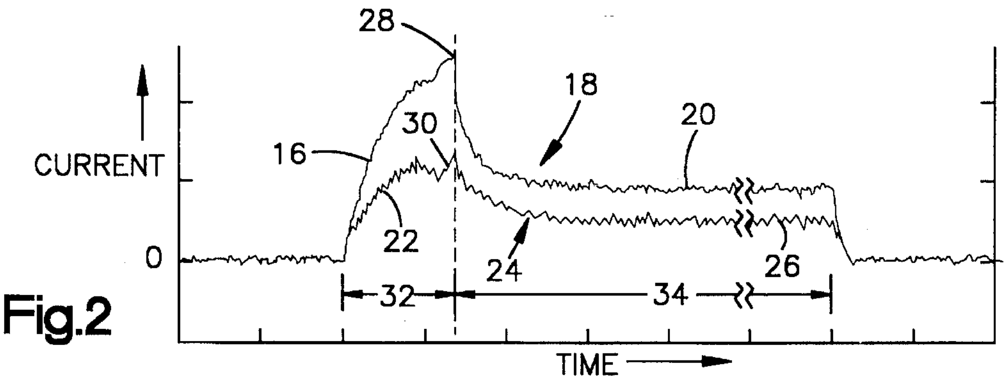
FIG. 2 is a plot illustrating the initial energization and holding current required by the first solenoid and the initial energization and holding current required by the second solenoid.

The solenoid 12 or 12*a* may be either one of two different solenoids. Thus, the solenoid 12 may be a first one of two solenoids. The first solenoid requires a relatively large initial energization current, indicated by a portion 16 of a curve 18 (FIG. 2). The first solenoid also requires a relatively large holding current, indicated by a portion 20 of the curve 18.

However, the solenoid 12 or 12*a* may be a second one of two solenoids, that is, a solenoid 12*a*. The second solenoid 12*a* requires a relatively small initial energization current, indicated by a portion 22 of a curve 24 (FIG. 2). The second solenoid 12*a* also requires a relatively small holding current, indicated by a portion 26 of the curve 24.

For example, in one specific embodiment of the invention, the solenoid control circuitry 10 was capable of being used with a first solenoid requiring an initial energization current having a value, indicated at 28 in FIG. 2, of approximately 2.54 amps. The first solenoid 12 requires a relatively large holding current, indicated at 20 in FIG. 2, of about 0.930 amps. Instead of the first solenoid, the solenoid control circuitry 10 could be used with a second solenoid 12*a* requiring an initial energization current having a value, indicated at 30 in FIG. 2, of approximately 1.33 amps. The second solenoid 12*a* requires a relatively small holding current, indicated at 26 in FIG. 2, of about 0.730 amps.

The initial energization time for both of the solenoids is the same, as indicated by an arrow 32 in FIG. 2. In this specific instance, the time 32 required for initial energization of either the first solenoid or the second solenoid was approximately 27 milliseconds. The holding time for the first solenoid and the second solenoid is the same and is indicated by an arrow 34 in FIG. 2. The duration of the holding time, indicated by the arrow 34 in FIG. 2, will depend upon the apparatus with which the solenoids are used. Of course, the specific initial energization current, initial energization time and holding current will depend on the specific characteristics of the specific solenoid 12 with which the control circuitry 10 is used.

In regard to the specific solenoids having the characteristics previously described and having characteristics corresponding to the plot of FIG. 2, the first solenoid 12 requiring the relatively large holding current was manufactured by RAM Co. of 64 North 800 East, St. George, Utah 84770, U.S.A. and had a part No. of 40R101102. This specific first solenoid had a resistance of approximately 13.6 ohms. The first solenoid had a power rating at a 100% duty cycle of 14 watts, a continuous voltage rating of 14 volts, and a continuous current rating of 1 amp. The second solenoid 12*a* requiring the relatively small holding current was manufactured by Lucas Ledex Inc. of 801 Scholz Drive, Vandalia, Ohio 45377, U.S.A. and had a part No. of 192895-001. This specific second solenoid had a resistance of approximately 25.7 ohms. In addition, the second solenoid had a power rating at a 100% duty cycle of 14.0 watts, a continuous voltage rating of 14 volts, and a continuous current rating of 0.76 amps.

It should be understood that other known solenoids could be utilized in place of the two specific solenoids previously described. The solenoids which are substituted for the two solenoids whose characteristics were previously described may not have characteristics which are in the same relationship to each other as the characteristics of the previously described solenoids. It should also be understood that the foregoing description of two specific solenoids having particular characteristics has been provided herein and will be referred to hereinafter, for purposes of clarity of description and not for purposes of limitation of the invention. It is contemplated that the solenoid control circuitry 10 may be constructed in accordance with the present invention so as to be used with any one of many different solenoids having many different characteristics.

It should also be understood that solenoids from more than two different manufacturers may be used with the solenoid control circuitry. Thus, in one specific instance, a third manufacturer provided a third solenoid which had electrical characteristics similar to the characteristics of the first solenoid. Any one of these three solenoids could be used with the solenoid control circuitry 10.

The solenoid control circuitry 10 includes a detector 40 (FIG. 1) which detects a characteristic of initial energization of the solenoid 12 or 12*a*. Although the solenoid control circuitry 10 could be constructed so as to detect one or more of many different characteristics of initial energization of the solenoid 12 or 12*a*, the detector 40 detects whether a relatively large initial energization current or a relatively small initial energization current is conducted to the solenoid 12 during initial energization of the solenoid or 12*a*.

If a relatively large initial energization current is detected by the detector 40, the solenoid control circuitry 10 provides the relatively large holding current 20 (FIG. 2) required by the first solenoid. If a relatively small initial energization current is detected by the detector 40, the solenoid control circuitry 10 provides the relatively small holding current 26 (FIG. 2) required by the second solenoid. In either case, the holding current is substantially less than the current which is required for initial energization of the solenoid. By providing holding current which is less than the initial energization current, the solenoid operating life is enhanced without impairing the ability of the solenoid to be rapidly operated.

During initial energization of either the first solenoid 12 requiring a relatively large holding current 20 (FIG. 2) or the second solenoid 12*a* requiring a relatively small holding current 26, the solenoid control circuitry 10 is effective to detect a fault in the solenoid 12 or 12*a*. If a fault is detected in the solenoid 12, the solenoid control circuitry 10 interrupts initial energization of the solenoid. Thus, as soon as a fault is detected in the solenoid 12 or 12*a* during initial energization of the solenoid, the solenoid control circuitry 10 interrupts energization of the solenoid to minimize the possibility of damage to the solenoid control circuitry and/or related apparatus.

Solenoid Control Circuitry—General Description

Figure 1:
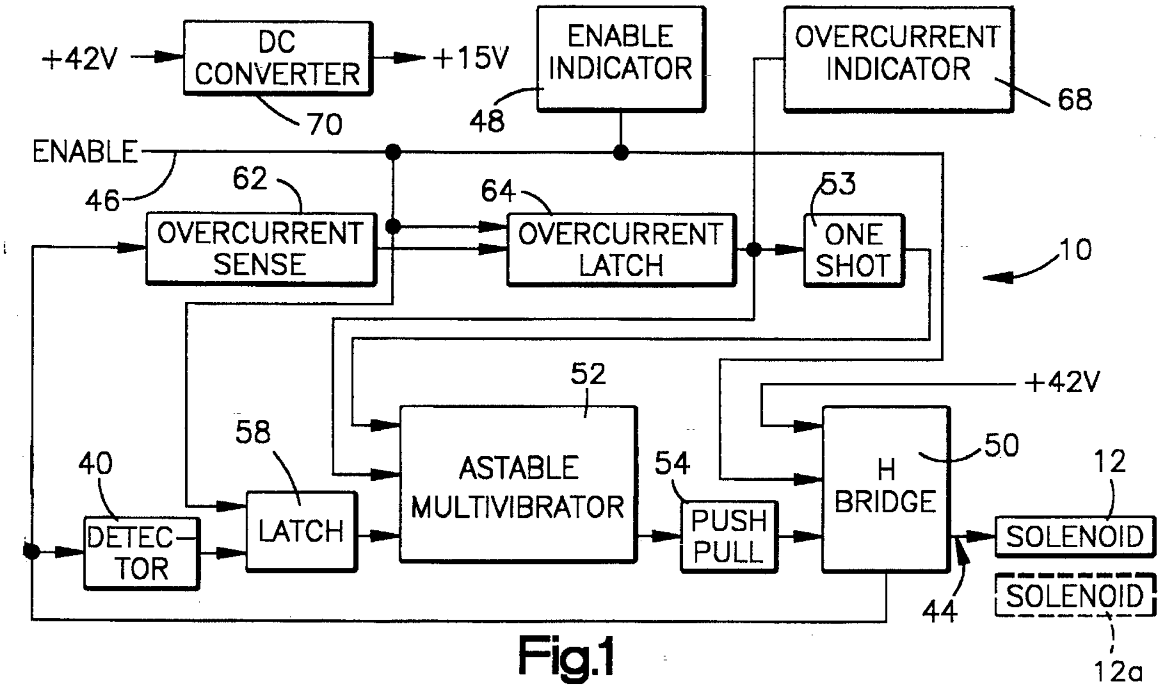
FIG. 1 is a schematic illustration of solenoid control circuitry constructed in accordance with the present invention and capable of being used with either a first solenoid requiring a relatively large holding current or a second solenoid requiring a relatively small holding current.

The solenoid control circuitry 10 includes an output, indicated schematically at 44 in FIG. 1, which is connectable with either the first solenoid 12 requiring a relatively large holding current 20 (FIG. 2) or the second solenoid 12*a* requiring a relatively small holding current 26. The solenoid control circuitry 10 also has an input 46 (FIG. 1) at which an enable signal is received. An enable indicator 48 indicates the presence of an enable signal at the input 46.

An H-bridge circuit 50 (FIG. 1) effects initial energization of the solenoid 12 or 12*a* connected to the output 44 in response to an enable signal at the input 46. The H-bridge circuit 50 uses the same voltage (+42 V) to effect initial energization of either the first solenoid requiring the relatively large holding current or the second solenoid requiring the relatively small holding current. Thus, initial energization of the first solenoid or the second solenoid is accomplished in the same manner by the solenoid control circuitry 10. Of course, the specific initial energization voltage will depend on the specific characteristics of the solenoids which may be used with the solenoid control circuitry 10.

The duration of the initial energization of the solenoid 12 or 12*a* is determined by a one-shot multivibrator 53. The one-shot multivibrator 53 is connected with an astable multivibrator 52. The astable multivibrator 52 is connected with the H-bridge circuit 50 through a push-pull amplifier or driver 54. The duration of the initial energization of the solenoid 12 or 12*a* is the same whether the solenoid is the first solenoid which requires a relatively large holding current or the second solenoid which requires the relatively small holding current. Thus, both solenoids are initially energized for the period of time indicated at 32 in FIG. 2.

Until initial energization of the solenoid 12 or 12*a* is undertaken, the solenoid control circuitry 10 (FIG. 1) does not know whether the first solenoid requiring a relatively large holding current or the second solenoid requiring a relatively small holding current has been connected with the output 44. During initial energization, the detector 40 detects whether the solenoid 12 or 12*a* is the first solenoid 12 requiring a relatively large holding current or the second solenoid 12*a* requiring a relatively small holding current. During initial energization of the solenoid 12 or 12*a*, the detector 40 detects whether the relatively large initial energization current 16 (FIG. 2) or the relatively small initial energization current 22 is conducted to the solenoid. The identity of the solenoid as being either the first solenoid 12 or the second solenoid 12*a* is maintained by a detector latch 58 (FIG. 1).

The astable multivibrator 52 varies its output voltage so as to have either a low duty output cycle or a high duty output cycle. When the detector 40 detects that the solenoid is the first solenoid 12 requiring a relatively large holding current 20, the astable multivibrator 52 has a low duty output cycle during the holding current time period, indicated at 34 in FIG. 2. When the detector 40 (FIG. 1) detects that the solenoid is the second solenoid 12*a* requiring a relatively small holding current 26, the astable multivibrator 52 has a high duty output cycle during the holding current time period, indicated by the arrow 34 in FIG. 2.

When the astable multivibrator 52 has a low duty output cycle, the output voltage from the multivibrator is low for a relatively large portion of the time 34 during which holding current is applied to the solenoid. The relatively small resistance of the first solenoid 12 requiring the large holding current enables the low duty output cycle to supply the required holding current of approximately 1.0 amps. When the astable multivibrator 52 has a high duty output cycle, the output voltage from the multivibrator is high for a relatively large portion of the time 34 during which holding current is applied to the solenoid. The relatively large resistance of the second solenoid 12*a* requiring the relatively small holding current necessitates using the high duty output cycle to supply the required holding current of approximately 0.8 amps.

The H-bridge circuit 50 (FIG. 1) responds to the low duty output cycle of the astable multivibrator 52 to provide the relatively large holding current required by the first solenoid 12. Similarly, the H-bridge circuit 50 responds to the high duty output cycle of the astable multivibrator 52 to provide the relatively small holding current required by the second solenoid 12*a*. When the output voltage from the astable multivibrator 52 is high, the H-bridge circuit 50 conducts holding current for the solenoid 12 or 12*a*. When the output voltage from the astable multivibrator 52 is low, the H-bridge circuit 50 interrupts the flow of holding current for the solenoid 12 12*a*.

It should be understood that the astable multivibrator 52 and H-bridge circuit 50 could be constructed so as to cooperate in a different manner. For example, during energization of the solenoid 12 requiring a relatively large holding current, the astable multivibrator 52 could have a high duty output cycle. The astable multivibrator 52 would then have a low duty output cycle during energization of the solenoid 12*a* requiring a relatively small holding current.

During initial energization of the solenoid 12 or 12*a*, an overcurrent sensor 62 (FIG. 1) detects the conducting of excessive current to the solenoid due to a fault in the solenoid or other cause. An overcurrent latch 64 maintains the output of the overcurrent sensor 62. In response to the overcurrent sensor 62 detecting the presence of an excessive initial energization current to the solenoid 12 or 12*a*, the one-shot multivibrator 53 and the astable multivibrator 52 are both reset to interrupt the initial energization of the solenoid 12 connected with the output 44. Therefore, only a portion of the initial energization current is applied to the defective solenoid and holding current is not applied to the defective solenoid. An overcurrent indicator 68 indicates when the overcurrent sensor 62 detects excessive flow of current to a solenoid.

A DC voltage converter 70 is provided in association with the solenoid control circuitry 10. The DC converter 70 converts a 42 volt main power source to a 15 volt power source for control functions. The main power source is controlled by the H-bridge circuit 50 to effect energization of the solenoid 12. Of course, voltages other than these specific voltages may be utilized if desired.

Solenoid Control Circuitry

The solenoid control circuitry 10 (FIGS. 3A and 3B) has a pair of output terminals 76 and 78 (FIG. 3B) at the output 44 to which the solenoid 12 is connected. The output terminals 76 and 78 can be connected with either the first solenoid 12 requiring a relatively large holding current or the second solenoid 12*a* requiring a relatively small holding current. It should be understood that only one of the two solenoids is connected with the output terminals 76 and 78 at any given time.

The input 46 (FIG. 3A) receives an enable signal of approximately +5 V when a solenoid 12 or 12*a* connected to the output terminals 76 and 78 is to be actuated. The enable signal renders a transistor 82 (FIG. 3A) conducting to render a current flow control transistor 84 (FIG. 3B) in the bridge circuit 50 conducting. When the transistor 84 is conducting, power (+42 V) is connected to output terminal 78 and the solenoid 12 or 12*a*. However, at this instant, a MOSFET 86 is in a nonconducting condition and the solenoid 12 or 12*a* remains de-energized.

Figure 3A:
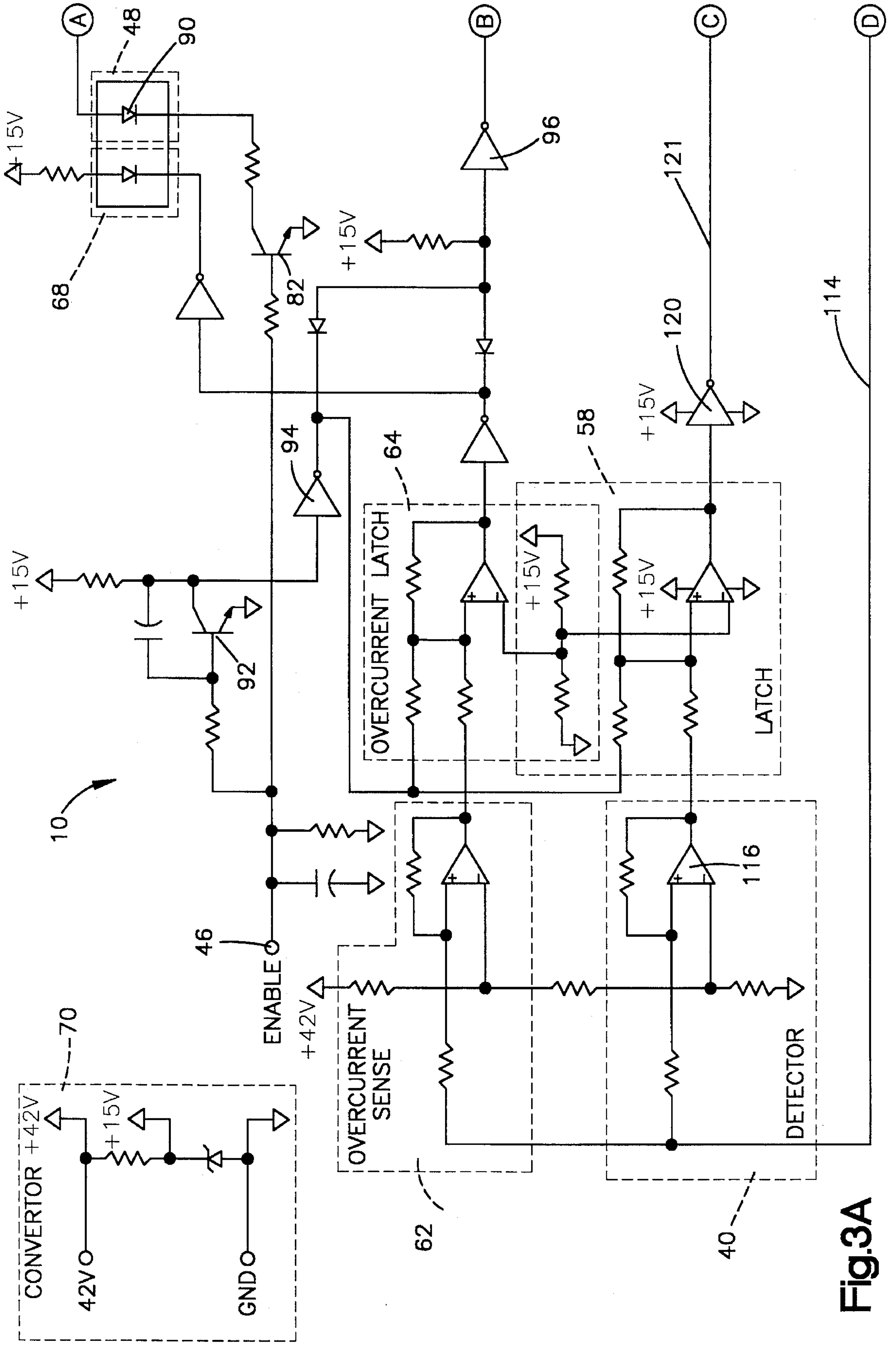
FIGS. 3A and 3B are a detailed schematic illustration of the solenoid control circuitry of FIG. 1.

The enable signal is transmitted from the input 46 to the transistor 84 through the enable indicator 48 (FIG. 3A). The enable signal energizes a light emitting diode 90 in the enable indicator 48. The diode 90 indicates when an enable signal is being provided at the input 46 to the solenoid control circuitry 10.

The enable signal is conducted from the input 46 to the base of a transistor 92 (FIG. 3A) to render the transistor conducting. This results in a low going input to an inverter 94. The high going output of the inverter 94 is transmitted to an inverter 96. The low going output from the inverter 96 is conducted to a trigger or input terminal 98 (FIG. 3B) of the one-shot multivibrator 53. The low going output signal from the inverter 96 is also conducted to an inverter 102. The resulting high going output signal is conducted to a reset terminal 104 of the astable multivibrator 52.

The input signal to the one-shot multivibrator 53 causes an output signal conducted from an output terminal 106 (FIG. 3B) of the astable multivibrator 52 to go high. The output signal from the terminal 106 of the astable multivibrator 52 remains high for a period of time determined by the characteristics of the one-shot multivibrator 53.

The one-shot multivibrator 53 forces the output at the terminal 106 of the astable multivibrator 52 to remain high for a period of time which corresponds to the initial energization period, indicated by the arrow 32 in FIG. 2. Thus, in the specific embodiment previously mentioned, the output at the terminal 106 (FIG. 3B) of the astable multivibrator 52 remains high for an initial energization time period 32 (FIG. 2) having a duration of approximately 27 milliseconds. Since the duration of the initial energization time period 32 of the solenoid 12 is determined by the one-shot multivibrator 53, the duration of the initial energization time period is the same (27 milliseconds) for the first solenoid requiring a relatively large holding current and the second solenoid requiring a relatively small holding current. Of course, the one-shot multivibrator 53 may be constructed so as to provide a different initial energization time period.

The high output signal of the astable multivibrator 52 is amplified by the push-pull amplifier 54 and is conducted to the gate of a MOSFET 86 in the H-bridge circuit 50. The high signal at the gate of the MOSFET 86 renders the MOSFET conducting to energize the solenoid 12. The MOSFET 86 remains conducting for the initial energization period during which the output at the terminal 106 of the astable multivibrator 52 remains high.

If the solenoid connected with the output terminals 76 and 78 of the solenoid control circuitry 10 is the first solenoid 12 which requires a relatively large holding current, a relatively large initial energization current 16 (FIG. 2) will be conducted from the transistor 84 (FIG. 3B) through the solenoid to the MOSFET 86. If the solenoid connected with the terminals 76 and 78 is the second solenoid 12*a* which requires a relatively small holding current, a relatively small initial energization current 22 (FIG. 2) will be conducted from the transistor 84 (FIG. 3B) through the solenoid to the MOSFET 86.

The detector 40 (FIG. 3A) detects whether there is a large or a small voltage drop across a sensor resistor 112 (FIG. 3B) in the H-bridge circuit 50. Thus, if the first solenoid which has a relatively small resistance and which requires a relatively large initial energization current and a relatively large holding current is connected with the terminals 76 and 78, the relatively large initial energization current will result in a relatively large voltage drop across the sensor resistor 112. However, if the second solenoid which has a relatively large resistance and which requires a relatively small initial energization current and a relatively small holding current is connected with the terminals 76 and 78, the relatively small initial energization current will result in a relatively small voltage drop across the sensor resistor 112.

A lead 114 conducts the voltage drop across the sensor resistor 112 to the input of an amplifier 116 (FIG. 3A) in the detector 40. The amplifier 116 compares the voltage signal conducted over the lead 114 to a preselected voltage. If the voltage drop across the sensor resistor 112 is relatively large, indicating that the first solenoid requiring a relatively large holding current is connected with the terminals 76 and 78, the output from the amplifier 116 will change from a low signal to a high signal. However, if the voltage conducted to the amplifier 116 over the lead 114 is relatively small, indicating that the second solenoid requiring a relatively small holding current is connected with the terminals 76 and 78, the output from the amplifier 116 will remain low.

The output from the detector latch 58 (FIG. 3A) is high when the output from the detector 40 is high and is low when the output from the detector 40 is low. However, the detector latch 58 maintains a high or low output after the initial energization period for the solenoid 12. Therefore, if the first solenoid requiring a relatively large holding current is connected with the output terminals 76 and 78, the detector latch 58 will maintain a high output. If the second solenoid requiring a relatively small holding current is connected with the output terminals 76 and 78, the detector latch 58 will maintain a low output.

Figure 3B:
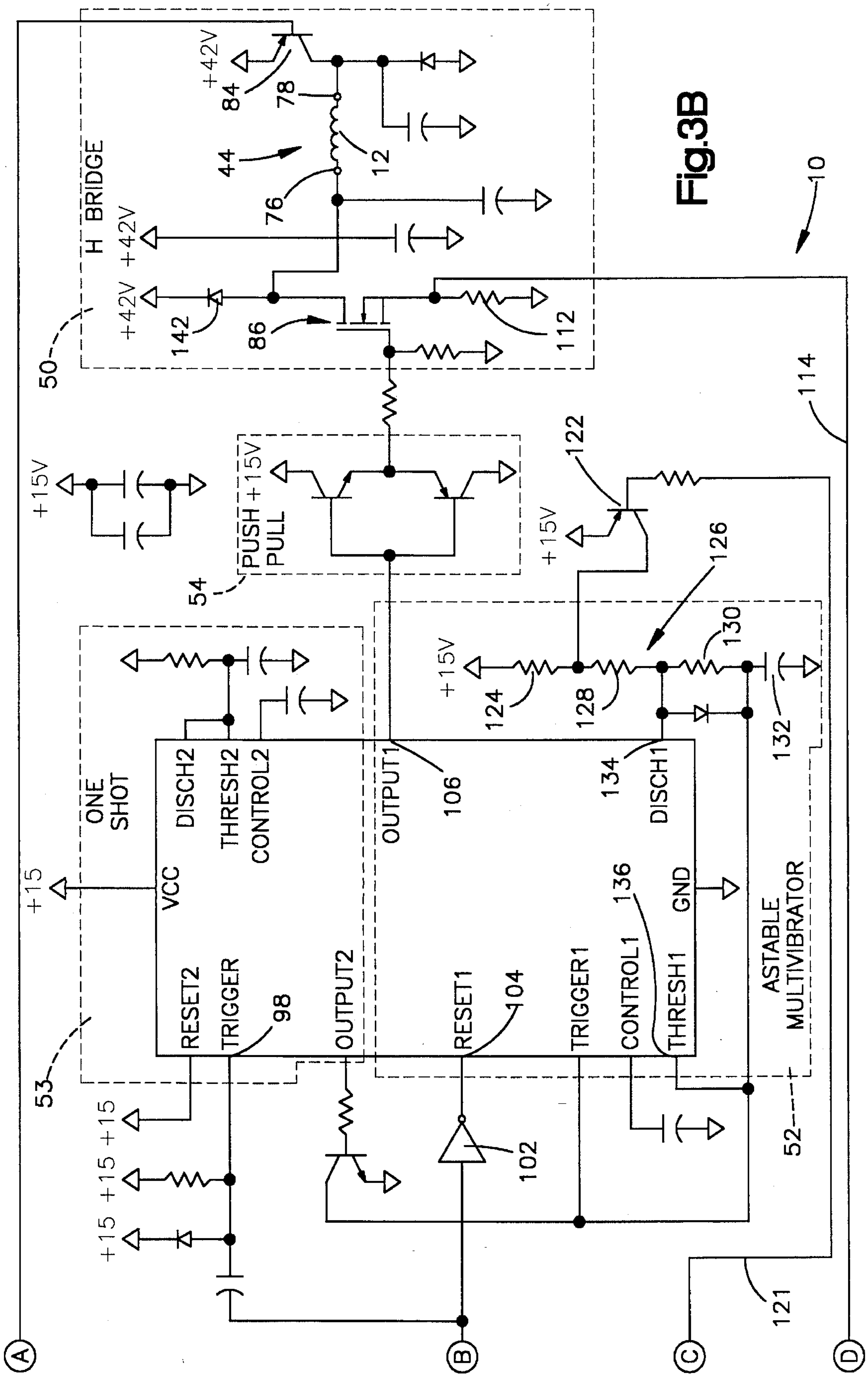

If the first solenoid, requiring a relatively large holding current, is present at the output terminals 76 and 78, the output of the latch 58 is high and a low signal is conducted from an inverter 120 (FIG. 3A) over a lead 121 to the base of a transistor 122 (FIG. 3B). This signal causes the transistor 122 to become conducting and effectively eliminates a resistor 124 from a series 126 of resistors. The series 126 of resistors includes the resistor 124 and resistors 128 and 130. By rendering the transistor 122 conducting to effectively eliminate the resistor 124 from the series 126 of resistors, a capacitor 132 can be charged to a predetermined level in a relatively short time.

If the second solenoid, requiring a relatively small holding current, is present at the output terminals 76 and 78, the output of the latch 58 is low and a high signal is conducted from the inverter 120 (FIG. 3A) over the lead 121 to the base of the transistor 122 (FIG. 3B). This signal results in the transistor 122 being maintained in a nonconducting condition so that the resistor 124 is included in the series 126 of resistors. By maintaining the resistor 124 in the series 126 of resistors, the time required to charge the capacitor 132 to a predetermined level is greater than when the resistor 124 is effectively eliminated from the series 126 of resistors.

During the initial energization period for either the first solenoid or the second solenoid, a discharge terminal 134 of the astable multivibrator 52 is conducting to prevent a build-up of a charge on the capacitor 132. Therefore, at the end of the initial energization period 32 (FIG. 2) for either the first solenoid or the second solenoid, the capacitor 132 is completely discharged.

After the one-shot multivibrator 53 (FIG. 3B) has timed out at the end of the initial energization time period 32 (FIG. 2) for either the first solenoid or the second solenoid, the output at the terminal 106 (FIG. 3B) of the astable multivibrator 52 goes low. The MOSFET 86 is then rendered nonconducting. This momentarily interrupts the flow of energization current to the solenoid 12 or 12*a*. The length of time for which the flow of energization current to the solenoid is interrupted will be relatively long if the first solenoid 12 requiring a relatively large holding current is connected with the terminals 76 and 78 and will be relatively short if the second solenoid 12*a* requiring a relatively small holding current is connected with the terminals 76 and 78.

When the one-shot multivibrator 53 has timed out at the end of the initial energization time period 32 (FIG. 2), the discharge terminal 134 (FIG. 3B) of the astable multivibrator 52 is made nonconducting. When the discharge terminal 134 of the astable multivibrator 52 is made nonconducting, the charging of the capacitor 132 begins. If the first solenoid requiring a relatively large holding current is connected with the output terminals 76 and 78, the transistor 122 is conducting to effectively eliminate the resistor 124 from the series 126 of resistors. This enables the capacitor 132 to be charged to a predetermined level in a relatively short period of time. For the specific embodiment of the invention described herein, this period of time is approximately 12 microseconds.

If the second solenoid requiring a relatively small holding current is connected with the output terminals 76 and 78, the transistor 122 is nonconducting. Therefore, the resistor 124 is effectively included in the series 126 of resistors. Therefore, a relatively long period of time is required to charge the capacitor 132 to the predetermined level. In the specific embodiment of the invention described herein, the time period to charge the capacitor 132 to the predetermined level through the resistors 124, 128 and 130 is approximately 23 microseconds. It should be understood that the foregoing specific time periods for charging of the capacitor 132 have been set forth herein merely for purposes of clarity of description and not for purposes of limitation of the invention. It is contemplated that different specific time periods for charging the capacitor 132 may be used if desired.

After a time period sufficient to enable the capacitor 132 to be charged to a predetermined level, a voltage corresponding to the predetermined charge level is conducted to a threshold voltage detection terminal 136 of the astable multivibrator 52. When the predetermined charge voltage has been conducted from the capacitor 132 to the threshold voltage detection terminal 136 of the astable multivibrator 52, the output terminal 106 of the astable multivibrator goes from high to low. At the same time, the discharge terminal 134 of the astable multivibrator 52 changes from nonconducting to conducting and thereby discharges the capacitor 132. The discharge terminal 134 of the astable multivibrator 52 remains conducting until the output at the terminal 106 of the multivibrator 52 goes from low to high.

The high output from the terminal 106 of the astable multivibrator 52 is transmitted through the push-pull amplifier 54 to the input gate of the MOSFET 86 in the H-bridge circuit 50. This renders the MOSFET 86 conducting to establish a flow of energization current through the solenoid connected with the terminals 76 and 78.

The output at the terminal 106 of the astable multivibrator 52 remains low for a length of time which is determined by the characteristics of the astable multivibrator 52. Therefore, the MOSFET 86 remains nonconducting for a predetermined length of time which is the same regardless of whether the first solenoid requiring a relatively large holding current or the second solenoid requiring a relatively small holding current is connected with the output terminals 76 and 78. When the MOSFET 86 becomes nonconducting, a relatively large decay current is conducted from the solenoid through the terminal 76 and a diode 142 (FIG. 3B) in the H-bridge circuit 50 to the main power source. In the specific embodiment of the invention described herein, the length of time for which the MOSFET 86 was maintained nonconducting for either the first solenoid or the second solenoid was 23 microseconds. 0f course, the MOSFET could be maintained nonconducting for a different length of time if desired.

After a predetermined time has elapsed, that is, 23 microseconds for the illustrated embodiment of the invention, the output of the astable multivibrator 52 goes high at the terminal 106. At the same time, the discharge terminal 134 of the astable multivibrator is rendered nonconducting. This results in the MOSFET 86 again becoming conducting and a charge again beginning to accumulate on the capacitor 132. When the threshold voltage detection terminal 136 of the astable multivibrator 52 senses that the charge on the capacitor 132 has reached the predetermined level, the output from the astable multivibrator changes from high to low.

The charging and discharging of the capacitor 132 is repeated to maintain the solenoid 12 or 12*a* connected with the terminals 76 and 78 energized with either a relatively small or a relatively large holding current. When the solenoid 12 or 12*a* is to be operated to an unactuated condition, the enable signal at the input terminal 46 is interrupted. This results in a low input to the reset terminal 104 of the multivibrator 52 to interrupt the energization of the solenoid 12 or 12*a*.

Since the first solenoid 12 requiring a relatively large holding current has a relatively small resistance, the relatively large holding current can be supplied in the relatively short time required to charge the capacitor 132 to a predetermined voltage with the resistance 124 effectively eliminated from the series 126 of resistors. Since the second solenoid 12*a* requiring a relatively small holding current has a relatively large resistance, the relatively long time required to charge the capacitor 132 to a predetermined voltage with the resistance 124 effectively in the series 126 is required to supply the relatively small holding current.

Figure 4:
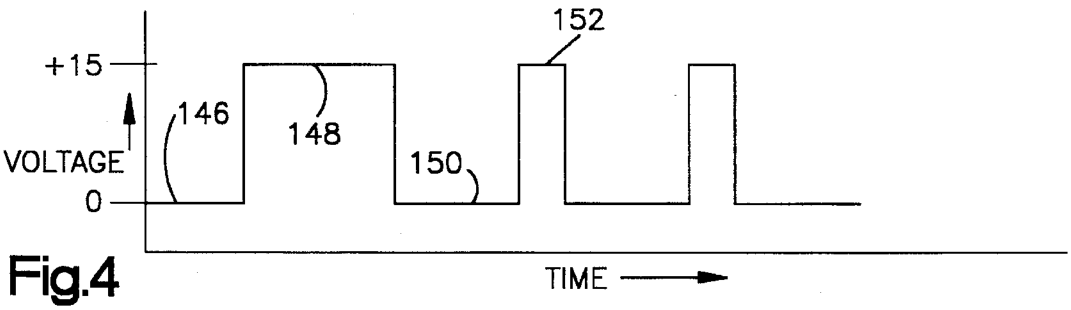
FIG. 4 is a plot illustrating the voltage at an output terminal of a multivibrator in the solenoid control circuitry of FIGS. 3A and 3B when the first solenoid requiring the relatively large holding current is connected with the solenoid control circuitry.

The manner in which the voltage at the output terminal 106 of the astable multivibrator 52 varies with time during energization of the first solenoid 12 requiring a relatively large holding current is illustrated schematically in FIG. 4. Prior to actuation of the first solenoid, the output voltage at the terminal 106 is low, as indicated at 146 in FIG. 4. During the initial energization of the first solenoid, the output voltage at the multivibrator terminal 106 is high, as indicated at 148 in FIG. 4. After the one-shot multivibrator 53 has timed out, in approximately 27 milliseconds, the output at the terminal 106 of the multivibrator 52 goes low, as indicated at 150 in FIG. 4. This results in the MOSFET 86 being rendered nonconducting to interrupt the flow of initial energization current to the solenoid 12.

After a relatively long predetermined time (23 microseconds), the output at the terminal 106 goes high, as indicated at 152 in FIG. 4. The output at the terminal 106 remains high to maintain the MOSFET 86 conducting for the relatively short time, indicated at 152 in FIG. 4, required to charge the capacitor 132 with the resistor 124 effectively eliminated from the series 126 of resistors. In one specific embodiment of the invention, the predetermined time period for which the MOSFET 86 was maintained conducting by the high output at the terminal 106 of the astable multivibrator 52 was approximately 12 microseconds. These steps are repeated to provide the relatively large holding current until energization of the first solenoid is interrupted.

During the supplying of holding current to the first solenoid, the astable multivibrator 52 has a low duty cycle. Thus, the astable multivibrator 52 remains low for a relatively large portion of its duty cycle so that the MOSFET 86 is nonconducting. Even though the astable multivibrator has a low duty cycle, a relatively large holding current is conducted through the relatively small resistance provided by the first solenoid.

Figure 5:
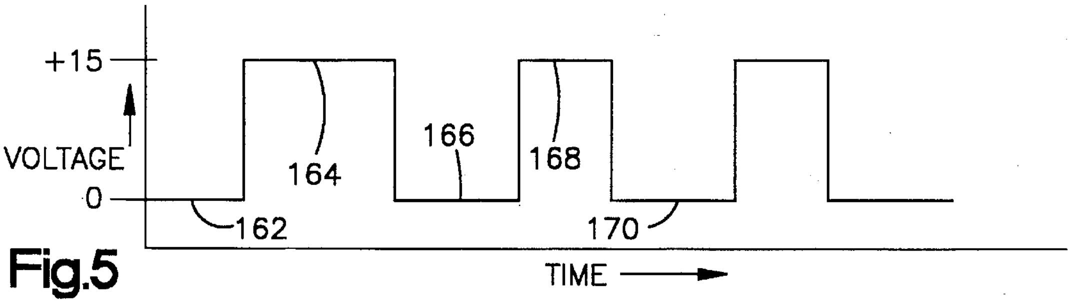
FIG. 5 is a plot illustrating the voltage at the output terminal of the multivibrator in the solenoid control circuitry of FIGS. 3A and 3B when the second solenoid requiring the relatively small holding current is connected with the solenoid control circuitry.

The manner in which the voltage at the output terminal 106 of the astable multivibrator 52 varies with time during energization of the second solenoid 12*a* requiring a relatively small holding current is illustrated schematically in FIG. 5. Prior to receiving the enable signal, the output at the terminal 106 of the multivibrator 52 is low, as indicated at 162 in FIG. 5. When the enable signal is received, the output from the astable multivibrator 52 goes high.

Initial energization of the second solenoid 12*a* occurs during the time period indicated at 164 in FIG. 5. The duration of the time period 164 (27 milliseconds) is determined by the one-shot multivibrator 53 and is the same as for the first solenoid requiring a relatively large holding current. After the initial energization period has elapsed and the one-shot multivibrator 53 has timed out, the output at the terminal 106 of the astable multivibrator 52 goes low, as indicated at 166 in FIG. 5, and the MOSFET 86 is rendered nonconducting. Since the voltage drop across the sensor resistor 112 is relatively small during the initial energization period, the transistor 122 remains nonconducting and a relatively long period of time (23 microseconds) is required to charge the capacitor 132.

After the charge on the capacitor 132 has reached a predetermined level, the presence of the predetermined voltage at the threshold voltage detection terminal 136 of the astable multivibrator 52 causes the output at the terminal 106 of the multivibrator to again go high, in the manner indicated at 168 in FIG. 5. At the same time, the discharge terminal 156 becomes conducting to discharge the capacitor 132. The output at the terminal 106 of the astable multivibrator 52 remains high for the time required to charge the capacitor 132 with the resistor 124 effectively in the series 126 of resistors, that is, for 23 microseconds.

After the time period required to charge the capacitor 132 (23 microseconds) has elapsed, the output at the terminal 106 of the astable multivibrator 52 again goes low, as indicated at 170 in FIG. 5. The duration of the time period 170 for which the output from the astable multivibrator 52 remains low for the second solenoid is the same as the duration of the time period 150 (FIG. 4) for which the output of the astable multivibrator remains low for the first solenoid. When the output at the terminal 106 of the astable multivibrator is low, as indicated at 170 in FIG. 5, the MOSFET 86 (FIG. 3B) is in a nonconducting condition. A decaying current is conducted from the terminal 78 through the second solenoid to the terminal 76. The decaying current is conducted through the diode 142 to the main power source.

When the second solenoid 12*a* requiring a relatively small holding current is connected with the output terminals 76 and 78, the astable multivibrator 52 has a high duty cycle. This is because the second solenoid has a relatively large resistance and the length of time for which the output from the astable multivibrator remains high must be relatively long to provide even the relatively small holding current. Thus, the time period indicated at 168 (23 microseconds) in FIG. 5 is substantially longer than the time period indicated at 152 (12 microseconds) in FIG. 4. Due to the relatively long duration of the high output from the astable multivibrator 52, the astable multivibrator is referred to as having a high duty cycle during the supplying of a relatively small holding current to the second solenoid 12*a*. Due to the relatively short duration of the high output from the astable multivibrator 52, the astable multivibrator is referred to as having low duty cycle during the supplying of a relatively large holding current to the first solenoid 12.

Conclusion

An improved solenoid 12 control circuitry 10 can be used with either a first solenoid requiring a relatively large holding current 20 (FIG. 2) or a second solenoid 12*a* requiring a relatively small holding current 26. The solenoid control circuitry 10 (FIG. 1) includes an output 44 which can be connected with either one of the solenoids. The solenoid control circuitry 10 is operable to provide a relatively large holding current to the output 44 when the first solenoid 12 requiring the relatively large holding current is connected with the output. The solenoid control circuitry 10 is operable to provide a relatively small holding current to the output 44 when the second solenoid 12*a* requiring a relatively small holding current, is connected with the output.

The solenoid control circuitry 10 is operable to initially energize a solenoid 12 or 12*a* connected with the output 44 to effect operation of the solenoid from an unactuated condition to an actuated condition. During initial energization of the solenoid 12 or 12*a* connected with the output 44, a detector 40 detects whether a characteristic of the initial energization of the solenoid corresponds to a characteristic of initial energization of a first solenoid 12 or a characteristic of initial energization of the second solenoid 12*a*. The solenoid control circuitry 10 provides a first holding current 20 (FIG. 2) to the solenoid 12 connected with the output 44 in response to detecting an initial energization characteristic corresponding to the first solenoid. The solenoid control circuitry 10 provides a second holding current 26, which is less than the first holding current, to the solenoid 12*a* connected with the output 44 in response to detecting an initial energization characteristic corresponding to the second solenoid.

Having described the invention, the following is claimed:

1. An apparatus for use with either a first solenoid requiring a first holding current of a first magnitude or a second solenoid requiring a second holding current of a second magnitude which is smaller than the magnitude of the first holding current, said apparatus comprising output means connectable with either the first solenoid or the second solenoid, and control circuit means connected with said output means for providing the first holding current of the first magnitude to said output means when the first solenoid is connected with said output means and for providing the second holding current of the second magnitude to said output means when the second solenoid is connected with said output means, said control circuit means being ineffective to provide the second holding current of a second magnitude to said output means when the first solenoid is connected with said output means, said control circuit means being ineffective to provide the first holding current of a first magnitude to said output means when the second solenoid is connected with said output means, said control circuit means including detector means connected with said output means for detecting which one of the first and second solenoids is connected with said output means, said detector means being operable to provide a first output when said first solenoid is connected with said output means, said detector means being effective to provide a second output which is different than the first output when said second solenoid is connected with said output means, and current control means connected with said detector means and said output means for providing a holding current of the first magnitude to said output means in response to said detector means providing the first output and for providing a holding current of the second magnitude in response to said detector means providing the second output.

2. An apparatus as set forth in claim 1 wherein said control circuit means includes means connected with said output means for providing an initial voltage at said output means for a first period of time in response to an enable signal, said current control means includes means for changing the voltage at said output means in a first manner in response to said detector means detecting that the first solenoid is connected with said output means and for changing the voltage at said output means in a second manner in response to said detector means detecting that the second solenoid is connected with said output means.

3. An apparatus as set forth in claim 1 wherein said control circuit means includes means connected with said output means for effecting initial energization of the first solenoid with a first voltage when the first solenoid is connected with said output means and for effecting initial energization of said second solenoid with the first voltage when said second solenoid is connected with said output means.

4. An apparatus as set forth in claim 3 wherein said detector means includes means connected with said output means for detecting whether the first solenoid or the second solenoid is connected with said output means as a function of a rate of flow of current to the solenoid connected with said output means during initial energization of the solenoid.

5. An apparatus as set forth in claim 1 wherein said control circuit means further includes fault detection circuit means connected with said output means for detecting a fault in the first or the second solenoid during initial energization of the first or the second solenoid as a function of the rate of flow of current to the solenoid connected with said output means during initial energization of the solenoid.

6. An apparatus as set forth in claim 1 wherein said current control means includes multivibrator means connected with said output means for providing an output having a first duty cycle when said detector means detects that the first solenoid is connected with said output means and for providing an output having a second duty cycle when said detector means detects that the second solenoid is connected with said output means.

7. An apparatus as set forth in claim 1 wherein said current control means includes means connected with said output means and said detector means for charging a capacitor to a predetermined level and for changing the amount of holding current supplied to said output means as a function of the amount of time required to charge the capacitor to the predetermined level, said detector means being operable to enable the capacitor to be charged to the predetermined level in a first period of time when the first solenoid is connected with said output means and to enable the capacitor to be charged to the predetermined level in a second period of time when the second solenoid is connected with said output means, said first period of time being of a different duration than said second period of time.

8. An apparatus as set forth in claim 1 wherein said current control means includes switch means connected with said detector means and operable between a conducting condition and a nonconducting condition and means for effecting operation of said switch means between the conducting and nonconducting conditions at a first rate in response to said detector means detecting that the first solenoid is connected with said output means and for effecting operation of said switch means between the conducting and nonconducting conditions at a second rate in response to said detector means detecting that the second solenoid is connected with said output means.

9. An apparatus for use with either a first solenoid having first characteristics and requiring a first holding current or a second solenoid having second characteristics and requiring a second holding current which is different than the first holding current, said apparatus comprising output means connectable with either the first solenoid or the second solenoid, means connected with said output means for initially energizing the one of the first and second solenoids connected with said output means to effect operation of the solenoid connected with said output means from an unactuated condition to an actuated condition, means connected with said output means for detecting whether a characteristic of the initial energization of the solenoid connected with said output means corresponds to a characteristic of initial energization of the first solenoid or a characteristic of initial energization of the second solenoid, and means connected with said output means for providing the first holding current to the solenoid connected with said output means in response to detecting that the initial energization of the solenoid connected with said output means has a characteristic corresponding to a characteristic of initial energization of the first solenoid and for providing the second holding current to the solenoid connected with said output means in response to detecting that the initial energization of the solenoid connected with said output means has a characteristic corresponding to a characteristic of initial energization of the second solenoid.

10. An apparatus as set forth in claim 9 wherein said means for providing the first holding current and for providing the second holding current includes multivibrator means which is connected with said output means and is operated with a first duty cycle to provide the first holding current and is operated with a second duty cycle to provide the second holding current.

11. An apparatus as set forth in claim 9 wherein said means for detecting whether a characteristic of the initial energization of the solenoid connected with said output means corresponds to a characteristic of energization of the first solenoid or a characteristic of energization of the second solenoid includes means connected with said output means for sensing a characteristic which is a function of the rate of flow of current through the solenoid connected with said output means and which has a first magnitude during initial energization of the first solenoid and a second magnitude during initial energization of the second solenoid.

12. An apparatus as set forth in claim 9 wherein said means for providing a first holding current and for providing a second holding current includes switch means connected with said output means and operable between a conducting condition and a nonconducting condition and means for effecting operation of said switch means between the conducting and nonconducting conditions at a first rate to provide the first holding current and for effecting operation of said switch means between the conducting and nonconducting conditions at a second rate to provide the second holding current.

13. An apparatus as set forth in claim 9 further including fault detection means connected with said output means for detecting an excessive rate of current flow during initial energization of the solenoid connected with said output means and for interrupting initial energization of a solenoid connected with said output means in response to detection of an excessive rate of current flow.

14. An apparatus for use with either a first solenoid requiring a first holding current or a second solenoid requiring a second holding current which is smaller than the first holding current, said apparatus comprising output means connectable with either the first solenoid or the second solenoid, said output means including first and second terminals connectable with either the first solenoid or the second solenoid, input means for receiving an enable signal, first switch means connected with said input means and the first terminal of said output means and operable from a nonconducting condition to a conducting condition in response to said input means receiving an enable signal, second switch means connected with the second terminal of said output means and operable between a conducting condition and a nonconducting condition, said first and second switch means completing an electrical circuit to energize a solenoid connected with the first and second terminals of said output means when said first and second switch means are in the conducting condition, multivibrator means connected with said input means and said second switch means for effecting operation of said second switch means from the nonconducting condition to the conducting condition for an initial period of time in response to said input means receiving an input signal to thereby effect initial energization of a solenoid connected with the first and second terminals of said output means, detector means connected with said output means for detecting whether a characteristic of the initial energization of the solenoid connected with the first and second terminals corresponds to a characteristic of initial energization of the first solenoid or the second solenoid, and means connected with said multivibrator means and said detector means for effecting operation of said multivibrator means to change said second switch means between the conducting and nonconducting conditions at a first rate in response to said detector means detecting a characteristic of the initial energization which corresponds to a characteristic of initial energization of the first solenoid to enable the first holding current to be conducted through said first and second switch means and for effecting operation of said multivibrator means to change said second switch means between the conducting and nonconducting conditions at a rate which is different than the first rate to change said second switch means between the conducting and nonconducting conditions at a second rate in response to said detector means detecting a characteristic of initial energization which corresponds to a characteristic of initial energization of the second solenoid to enable the second holding current to be conducted through said first and second switch means.

15. An apparatus as set forth in claim 14 wherein said means for effecting operation of said multivibrator means to change said second switch means between the conducting and nonconducting conditions at a first rate and for effecting operation of said multivibrator means to change said second switch means between the conducting and nonconducting conditions at a second rate includes means for charging a capacitor connected with said multivibrator means to a predetermined level and means for causing the time required to charge the capacitor to the predetermined level to be a first period of time in response to said detector means detecting that a characteristic of initial energization of the solenoid connected with the first and second terminals corresponds to a characteristic of the first solenoid and for causing the time required to charge the capacitor to the predetermined level to be a second period of time in response to said detector means detecting that a characteristic of initial energization of the solenoid connected with the first and second terminals corresponds to a characteristic of the second solenoid.

16. An apparatus comprising a solenoid having either a large or a small initial energization current magnitude, circuit means connected with said solenoid for providing an electrical current to initially energize said solenoid, and sensor means connected with said circuit means for sensing whether the magnitude of the electrical current provided by said circuit means during initial energization of said solenoid corresponds to the large or the small initial energization current magnitude; said circuit means including means for providing a first electrical holding current of a first magnitude to maintain said solenoid energized in response to said sensor means sensing initial energization of said solenoid with an electrical current of a large magnitude and for providing a second electrical holding current of a second magnitude to maintain said solenoid energized in response to said sensor means sensing initial energization of said solenoid with an electrical current of a small magnitude.

17. An apparatus as set forth in claim 16 wherein said means for providing a first electrical current of a first magnitude to maintain said solenoid energized in response to said sensor means sensing initial energization of said solenoid with an electrical current of a large magnitude and for providing electrical current of a second magnitude to maintain said solenoid energized in response to said sensor means sensing initial energization of said solenoid with an electrical current of a small magnitude includes multivibrator means connected with said solenoid for providing an output having a first duty cycle when said sensor means senses initial energization of said solenoid with an electrical current of a large magnitude and for providing an output having a second duty cycle when said sensor means senses initial energization of said solenoid with an electrical current of a small magnitude.

18. An apparatus as set forth in claim 16 wherein said means for providing a first electrical current of a first magnitude to maintain said solenoid energized in response to said sensor means sensing initial energization of said solenoid with an electrical current of a large magnitude and for providing an electrical current of a second magnitude to maintain said solenoid energized in response to said sensor means sensing initial energization of said solenoid with an electrical current of a small magnitude includes means for applying a voltage to said solenoid and means for changing the voltage applied to said solenoid in a first manner in response to said sensor means sensing that said solenoid is initially energized with an electrical current of a large magnitude and for changing the voltage applied to said solenoid in a second manner in response to said sensor means sensing that said solenoid is initially energized with an electrical current of a small magnitude.

19. An apparatus as set forth in claim 16 wherein said means for providing an electrical current of a first magnitude to maintain said solenoid energized in response to said sensor means sensing initial energization of said solenoid with an electrical current of a large magnitude and for providing an electrical current of a second magnitude to maintain said solenoid energized in response to said sensor means sensing initial energization of said solenoid with an electrical current of a small magnitude includes a capacitor and means for charging said capacitor to a predetermined level and for changing the electrical current used to maintain said solenoid energized as a function of the amount of time required to charge said capacitor to the predetermined level.

20. An apparatus as set forth in claim 16 wherein said means for providing an electrical current of a first magnitude to maintain said solenoid energized in response to said sensor means sensing initial energization of said solenoid with an electrical current of a large magnitude and for providing an electrical current of a second magnitude to maintain said solenoid energized in response to said sensor means sensing initial energization of said solenoid with an electrical current of a small magnitude includes switch means connected with said sensor means and operable between a conducting condition and a nonconducting condition and means for effecting operation of said switch means between the conducting and nonconducting conditions at a first rate in response to said sensor means sensing initial energization of said solenoid with an electrical current of a large magnitude and for effecting operation of said switch means between the conducting and nonconducting conditions at a second rate in response to said sensor means sensing initial energization of said solenoid with an electrical current of a small magnitude.

21. An apparatus comprising a solenoid having a first initial energization characteristic or either a first magnitude or a second magnitude, output means connected with said solenoid, said output means including first and second terminals connected with said solenoid, input means for receiving an enable signal, first switch means connected with said input means and the first terminal of said output means and operable from a nonconducting condition to a conducting condition in response to said input means receiving an enable signal, second switch means connected with the second terminal of said output means and operable between a conducting condition and a nonconducting condition, said first and second switch means completing an electrical circuit to energize said solenoid when said first and second switch means are in the conducting condition, multivibrator means connected with said input means and said second switch means for effecting operation of said second switch means from the nonconducting condition to the conducting condition for an initial period of time in response to said input means receiving an input signal to thereby effect initial energization of said solenoid, detector means connected with said output means for detecting whether a characteristic of initial energization of said solenoid corresponds to the first magnitude or the second magnitude, and means connected with said multivibrator means and said detector means for effecting operation of said multivibrator means to change said second switch means between the conducting and nonconducting conditions at a first rate in response to said detector means detecting a characteristic of initial energization of the first magnitude to enable a first holding current to be conducted through said first and second switch means and for effecting operation of said multivibrator means to change said second switch means between the conducting and nonconducting conditions at a rate which is different than the first rate to change said second switch means between the conducting and nonconducting conditions at a second rate in response to said detector means detecting a characteristic of initial energization of the second magnitude to enable a second holding current to be conducted through said first and second switch means.

22. An apparatus as set forth in claim 21 wherein said means for effecting operation of said multivibrator means to change said second switch means between the conducting and nonconducting conditions at a first rate and for effecting operation of said multivibrator means to change said second switch means between the conducting and nonconducting conditions at a second rate includes a capacitor connected with said multivibrator means, means for charging said capacitor to a predetermined level, and means for causing the time required to charge the capacitor to the predetermined level to be a first period of time in response to said detector means detecting that the characteristic of initial energization of said solenoid corresponds to the first magnitude and for causing the time required to charge the capacitor to the predetermined level to be a second period of time in response to said detector means detecting that the characteristic of initial energization of said solenoid corresponds to the second magnitude.

* * * * *